US006185202B1

United States Patent
Göckler et al.

(10) Patent No.: US 6,185,202 B1
(45) Date of Patent: Feb. 6, 2001

(54) POINT-TO-MULTIPOINT RADIO TRANSMISSION SYSTEM

(75) Inventors: Heinz Göckler; Thomas Alberty, both of Backnang (DE)

(73) Assignee: Robert Bosch GmbH, Stuttgart (DE)

( * ) Notice: Under 35 U.S.C. 154(b), the term of this patent shall be extended for 0 days.

(21) Appl. No.: 09/155,391

(22) PCT Filed: Dec. 7, 1996

(86) PCT No.: PCT/DE96/02349

§ 371 Date: Feb. 11, 1999

§ 102(e) Date: Feb. 11, 1999

(87) PCT Pub. No.: WO97/36433

PCT Pub. Date: Oct. 2, 1997

(30) Foreign Application Priority Data

Mar. 27, 1996 (DE) .............................. 196 12 108

(51) Int. Cl.[7] .............................. H04J 1/00; H04B 7/208
(52) U.S. Cl. .......................... 370/344; 370/281; 370/344
(58) Field of Search .................................. 370/281, 295, 370/344, 343, 468, 341, 282; 375/219, 220, 222, 276, 277; H04B 7/208

(56) References Cited

U.S. PATENT DOCUMENTS

| | | | |
|---|---|---|---|
| 4,385,392 | * 5/1983 | Angell et al. | 375/8 |
| 4,706,239 | 11/1987 | Ito et al. | |
| 4,785,450 | 11/1988 | Bolgiano et al. | |
| 4,965,852 | * 10/1990 | Sasaki | 455/82 |
| 5,208,804 | * 5/1993 | Wilson et al. | 370/30 |
| 5,365,545 | * 11/1994 | Blackwell et al. | 375/8 |
| 5,512,898 | * 4/1996 | Norsworthy et al. | 341/155 |
| 5,768,311 | * 6/1998 | Betts et al. | 375/222 |

FOREIGN PATENT DOCUMENTS 36 21 737  1/1988 (DE) .
44 26 183  10/1995 (DE) .
2098029  11/1988 (GB) .

OTHER PUBLICATIONS

R. McGuire, "Technologies for an Exchange Radio", Proceedings of the National Communications Forum, vol. 43, No. 2, Oct. 2, 1989, pp. 869–882.
T. Le–Ngoc et al., "ISDN Implementation for a Point–To–Multipoint Subscriber Radio System", Computer Communications, vol. 13, No. 3, Apr. 1, 1990, pp. 131–135
"Mikrowellenmagazin", vol. 10, No. 6, 1984, pp. 629–630.
H. Göckler et al., "Digitale Mehrträger–Demultiplexer für den mobilen Satellitenfunk", Frequenz publication, vol. 42 (1988), No. 6–7, pp. 181–189.

(List continued on next page.)

*Primary Examiner*—Ajit Patel
*Assistant Examiner*—Hanh Nguyen
(74) *Attorney, Agent, or Firm*—Kenyon & Kenyon

(57) ABSTRACT

In order to allow a flexible allocation of transmission capacities in a radio transmission system, without disrupting or interrupting existing radio connections, a control device is provided which, in the event of a change in the transmission channels, adjusts one or more of the transmission parameters in a central station and in affected subscriber stations in such a way that the bandwidth of the available radio channel is optimally utilized. For this purpose, the modems present in the central station and in the subscriber stations are equipped with two transmitted signal paths and two paths and two received signal paths, only one of received signal paths (ENC1, ENC2, IF1, IF2, MOD1, MOD2, DEM1, DEM2, DF1, DF2, DEC1, DEC2), only one of which is activated in each case for a signal transmission. The outputs of the transmitted signal paths and the inputs of the received signal paths are equipped with frequency splitters. In the event of a change in the transmission channels, the adjustment to the new transmission parameters takes place in the signal path that is not currently activated, and after acquisition of the new transmission parameters is complete, operation switches over to that signal path.

18 Claims, 6 Drawing Sheets

OTHER PUBLICATIONS

E. Auer et al., "Advanced Modem Equipment for Intelsat IDR/IBS Services", Proceedings of Second European Conference on Satellite Communications, Liège, Belgium, Oct. 1991, ESA SP–332, pp. 457–464.

H. Nicholas et al., "An Analysis of the Output Spectrum of Direct Digital Frequency Synthesizers in the Presence of Phase–Accumulator Truncation," IEEE 1987, 41st Annual Frequency Control Symposium, pp. 495–502.

* cited by examiner

POINT-TO-MULTIPOINT RADIO TRANSMISSION SYSTEM

FIELD OF THE INVENTION

The present invention relates to a point-to-multipoint radio transmission system including a central station and multiple subscriber stations, the transmission channels being apportionable as necessary between the central station and the subscriber stations.

BACKGROUND INFORMATION

Radio transmission systems, whether terrestrial radio relay systems or satellite transmission systems, make it possible to install new radio connections, or expand existing ones, very quickly. In such radio transmission systems, the frequency spectrum available should be utilized as optimally as possible. This requirement can be met with point-to-multipoint radio transmission systems (radio relay, satellite radio).

A point-to-multipoint radio relay system is described in "Mikrowellenmagazin" Vol. 10, Number 6, 1984, pp. 629, 630. According to this, publication utilization of the frequency band of the available radio channel can be improved by assigning the necessary frequency band only as necessary. Communication between the central station and the individual subscriber stations takes place either by either frequency-divided multiple access (FDMA) or time-divided multiple access (TDMA), the frequency channels or time slots being apportioned to the subscribers as required.

In a point-to-multipoint radio relay system as described in German Patent Application No. 44 26 183, the transmission capacity is adapted flexibly to subscriber requirements in that the bandwidth of the individual transmission channels is adjusted to the data transmission rate requested in each case by the individual subscribers. Provision is also made for variable setting of the modulation type or modulation depth (for example, n-PSK with n=2 to 16, or M-QAM with M=4 to 256) on the individual transmission channels.

It is the object of the present invention to provide a point-to-multipoint radio transmission system with which transmission capacities can be flexibly allocated and adapted to the on-line subscriber stations without interfering with or interrupting existing radio connections.

SUMMARY OF THE INVENTION

The stated object is achieved by the features of claim 1, by the fact that a control device is present which, in the event of a change in the transmission channels, adjusts one or more transmission parameters in modems with which both the central station and each subscriber station are equipped, in such a way that the bandwidth of the available radio channel is optimally utilized. In this context, each modem has two transmitting channels and two receiving channels, and signal transmission in the modem takes place via only one of the two transmitting or receiving channels. In the event of a change in the transmission channels, the adjustment to the new transmission parameters takes place in the transmitting or receiving channel which is not in operation at the time, while signal transmission continues on the other transmitting or receiving channel. Once acquisition of the new transmission parameters is complete, operation switches over to the transmitting or receiving channel which was not previously in operation. A first frequency splitter is provided which divides the entire frequency band available for the emission of signals into at least two subbands, the signals of the transmitting channels being selectably apportionable to the subbands. Also provided is a second frequency splitter which divides the entire frequency band available for received signals into at least two subbands, the signals of the subbands being selectably apportionable to the receiving channels.

The above-described features make it possible, in a point-to-multipoint radio transmission system, to adapt the available radio channel very flexibly to the necessary transmission channels of the individual subscribers, with no need to interfere with or interrupt radio connections. All transmission parameters can be controlled, with the goal of both efficiently utilizing the radio channel and optimizing signal transmission quality. Use of the digital frequency splitters, whose subbands can selectably be assigned to the transmitting or receiving channels, makes possible a very flexible distribution of the transmitting and receiving channels. In addition, the digital frequency splitter can reduce or increase (for example, halve or double) its input signal sampling frequency so that subsequent interpolators or decimators need to implement lower interpolation or decimation factors, thus decreasing the circuit outlay.

DETAILED DESCRIPTION

Figure 1:
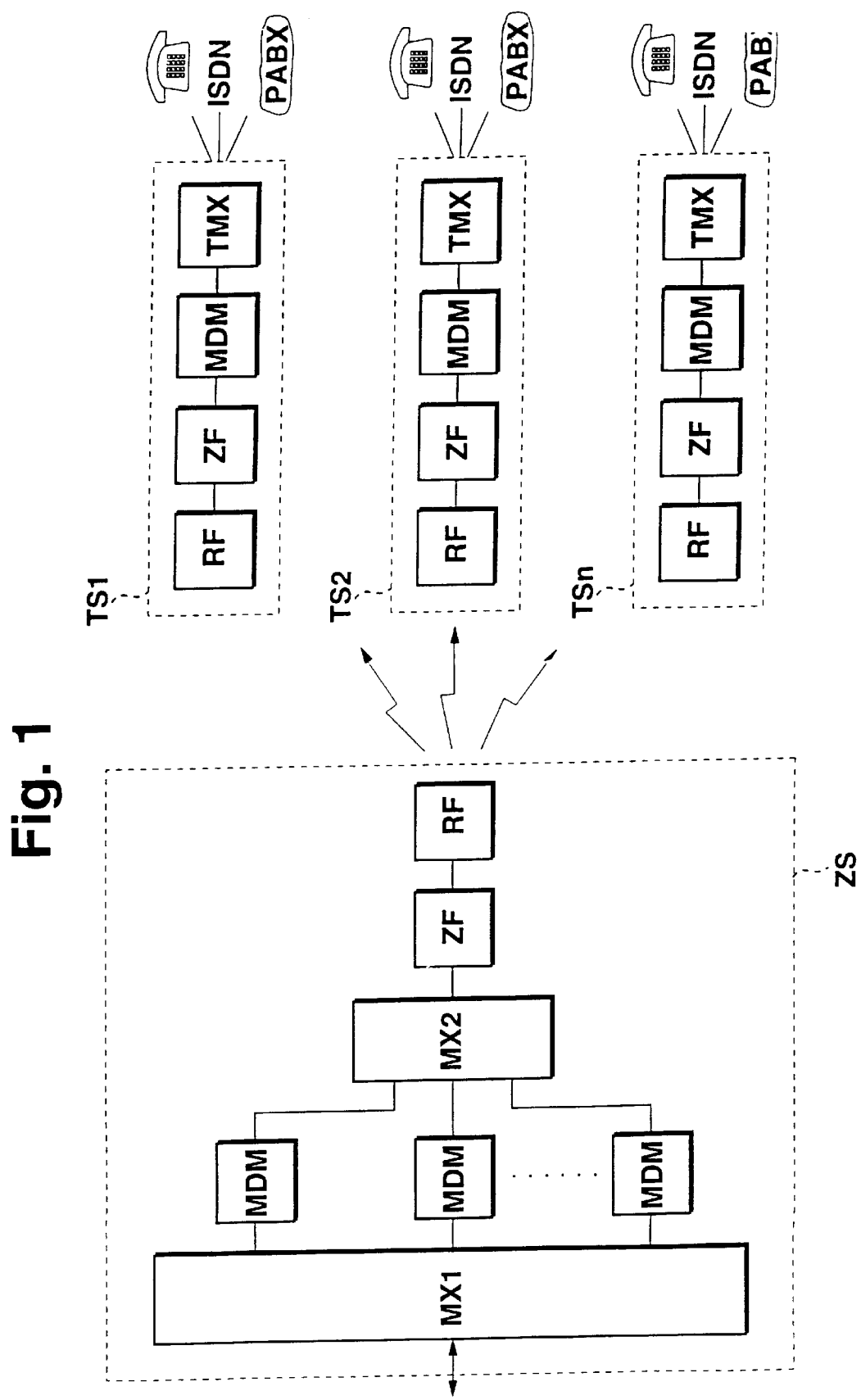
FIG. 1 shows a block diagram of a point-to-multipoint radio transmission system.

The point-to-multipoint radio transmission system depicted schematically in FIG. 1 includes a central station ZS and multiple subscriber stations TS1, TS2 . . . , TSn. Central station ZS has a quantity of modems MDM, connected in parallel, equal to the maximum number of subscriber stations TS1, TS2 . . . TSn which can enter into a radio connection with central station ZS. All modems MDM of central station ZS are connected together at both outputs via multiplexers/demultiplexers MX1 and MX2. First multiplexer/demultiplexer MX1 creates the connection to other communication networks. Connected to second multiplexer/demultiplexer MX2 is a circuit block ZF with which signals that are received or to be sent out are converted to an intermediate frequency level. This is followed by a transmit/receive unit (front end) RF.

The individual subscriber stations TS1, TS2 . . . TSn have a similar configuration. A transmit/receive unit RF is followed by an intermediate-frequency circuit ZF which in turn is connected to a modem MDM. A terminal multiplexer/demultiplexer TMX constitutes the connection between modem MDM and subscriber point devices (for example, telephones) or public or private communication networks (for example, ISDN, PABX).

Figure 2:
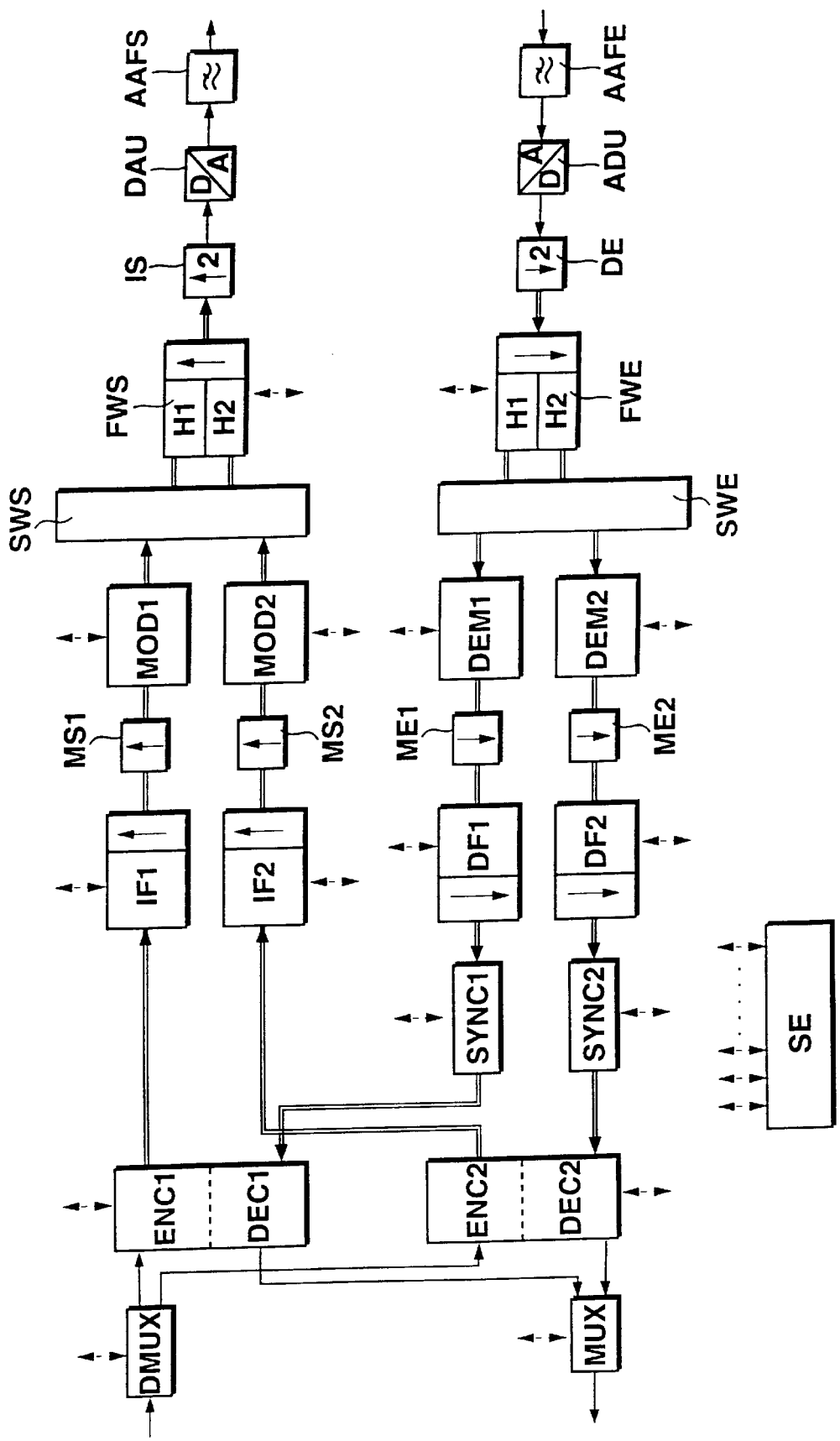
FIG. 2 shows a block diagram of a modem according to the present invention.

FIG. 2 shows an example of the configuration of a modem MDM that is used in similar fashion in central station ZS and in the individual subscriber stations TS1, TS2 . . . TSn. The modem has two transmitting channels and two receiving channels; in the exemplary embodiment depicted here, a separate signal path implemented with circuit technology is provided for each transmitting channel and for each receiving channel.

In the transmitting direction, a demultiplexer DMUX switches an outgoing data signal to one of two encoders ENC1 or ENC2.

Each encoder ENC1, ENC2 belongs to one of the two transmitted-signal paths, whose connecting lines are drawn with double lines because the data signals here are complex, i.e. possess a real component and an imaginary component. Each encoder ENC1, ENC2 is followed by a respective digital interpolation filter IF1, IF2 with a variable interpolation factor. Following this in each signal path is a modulator MOD1, MOD2, which can nevertheless also be preceded by an interpolator MS1, MS2 with a fixed interpolation factor. Each of the two modulators MOD1, MOD2 is tuned to one of two transmitting channels. The outputs of the two modulators MOD1 and MOD2 are conveyed via a switch SWS to a frequency splitter FWS having two subband filters H1, H2. A frequency splitter of this kind, consisting of two complex half-band filters, is known, for example, from the journal "Frequenz," 42 (1988), No. 6–7, pp. 181–189. The frequency subbands of subband filters H1, H2 are selected so that they cover the entire frequency band available for the emission of signals. It is preferable if the frequency subbands overlap one another, so that even signals having a frequency lying in the center of the overall frequency band can be transmitted by frequency splitter FWS. The center frequencies fm of the two subband filters H1, H2 can, for example, lie at fm=(2m −1) fa/8, where m=1, 2, 3 , or 4, and fa is the output signal sampling frequency of frequency splitter FWS. For example, first subband filter H1 can have a center frequency fm=3 fa/8, and second subband filter H2 a center frequency fm=5 fa/8. Frequency splitter FWS also performs a sampling rate increase (interpolation), so that the interpolation factor of variable interpolation filters IF1, IF2 can be set lower.

Switch SWS can selectably switch the individual transmitting channels through to one or the other subband filter H1 or H2 of frequency splitter FWS. Switch SWS is controlled by a control unit SE described below in more detail.

The complex digital output signal of frequency splitter FWS is converted by an interpolator IS, with a fixed interpolation factor of 2, into a real digital signal (as described in, for example, German Patent No. 36 21 737). The real digital data signal is then converted by a digital/analog converter DAU into an analog signal which is then passed through an antialiasing filter AAFS.

In the opposite (receiving) direction, a received analog data signal passes through an antialiasing filter AAFE to an analog/digital converter DAU. A decimator DE with a fixed decimation factor of 2 (as described in, for example, German Patent No. 36 21 737) converts the real digital output signal of analog/digital converter ADU into a complex digital signal. This complex digital signal is switched through, by a frequency splitter FWE and a downstream switch SWE, onto one of two received-signal paths. The remarks already made in connection with frequency splitter FWS for the transmitting channels also apply to the position of the frequency subbands of frequency splitter FWE. Frequency splitter FWE performs a sampling rate reduction (decimation). Because the frequency splitter has authorized the overall frequency band available for the received signals to be distributed into narrower subbands, the sampling theorem is satisfied for the individual receiving channels. Disruptive overlaps therefore do not occur during demodulation, since the condition that the sampling frequency must be at least as great as the signal bandwidth (i.e. must correspond to one subband of the frequency splitter) is satisfied. The statements made here concerning the sampling theorem in connection with the receiving channels also apply analogously to the transmitting channels.

Switch SWE can switch the output signals of subband filters H1, H2 of frequency splitter FWE through, in any combination, onto the downstream received-signal paths.

A complex digital demodulator DEM1 and DEM2, tuned to one of two receiving channels, is located in each received-signal path. Downstream from each demodulator DEM1, DEM2 is a decimation filter DF1, DF2 with a variable decimation factor (matched filter), possibly with interposition of a decimator ME1, ME2 with a fixed decimation factor. Since frequency splitter FWE is already performing a decimation operation, the decimation factor of variable decimation filter DF1, DF2 can be set lower.

The interpolators and decimators for changing the sampling frequency by a fixed factor are preferably configured as nonrecursive (FIR) filters with, if necessary, linear phase; with linear phase, particularly efficient circuits result due to the utilization of coefficient symmetry. Further reductions in complexity can be attained by configuring these filters as half-band filters. Lastly, the operation rate (number of operations per time unit) can be minimized by implementing these interpolators and decimators as polyphase filters. A further reduction in circuit complexity and in power dissipation can be achieved if, in the case of the fixed decimators and interpolators, the general multiplications are replaced by positionally correct addition and/or subtraction of the state variables (CSD code representation of coefficients).

Decimation filters DF1, DF2, like interpolation filters IF1, IF2, satisfy the Wurzel-Nyquist condition. The configuration and manner of operation of variable decimation and interpolation filters of this type are described in "Proceedings, Second European Conference on Satellite Communications," Liège, Belgium, October 1991, ESA SP-332, pp. 457–464.

Synchronization circuits SYNC1 and SYNC2, as also described in "Proceedings, Second European Conference on Satellite Communications," are located in the two received-signal paths. They synchronize the circuits in the respective signal path to the carrier frequency, carrier phase, and sampling cycle of the received data signal. The modem is thus independent of synchronization signals which otherwise would need to be transmitted together with the received signals.

A decoder DEC1, DEC2 is located at the end of each received-signal path. Both coding in the transmitted-signal paths and decoding in the received-signal paths are preferably accomplished with Viterbi coders/decoders. The outputs of both decoders DEC1, DEC2 lead to a multiplexer MUX.

The complex carrier oscillations for the complex digital modulators MOD1, MOD2 and demodulators DEM1, DEM2 are advantageously generated with the direct digital synthesis (DDS) method (described in "An Analysis of the Output Spectrum of Direct Digital Frequency Synthesizers in the Presence of Phase-Accumulator Truncation," IEEE 1987, 41st Annual Frequency Control Symposium, p. 495 ff.), or by linear interpolated digital synthesis.

The point-to-multipoint radio transmission system is intended, as indicated initially, to allow extremely flexible apportionment of transmission channels between the central station and subscriber stations, with optimum utilization of the available radio channel. If there is a change in the number of transmission channels required, because one or more subscriber stations begin a new data exchange with the central station or discontinue data transmission, the transmission parameters in the modems in the central station and subscriber stations affected by the change in transmission channels are modified, from a control device SE present in central station ZS, in such a way that the transmission channels efficiently occupy the radio channel. The transmission parameters that can be changed include, for example, the data rate, the modulation type or modulation depth (for example, n-PSK with n=2 to 16, or M-QAM with M=4 to 256), the coding, the channel frequency, or the transmitting level and parameters for signal quality evaluation intended to ensure a predefined data transmission quality (for example a bit error rate<$10^{-7}$) and minimize radio field effects (fading, reflections).

When there is a change in the number of transmission channels required, control device SE therefore calculates the transmission parameters on the basis of the aforesaid criteria for efficient utilization of the overall bandwidth of the radio channel and for optimum signal transmission quality. These modified transmission parameters are issued by control device SE as control signals (shown as dashed double-arrow lines in the Figures) to the relevant circuit blocks in the modems. The control signals for the modems in the subscriber stations are transmitted, for example, via a signaling channel, which either is appended to one or more usable signal channels or is sent out as a separate broadcast channel.

Of the transmission parameters, the data rate is set in the variable interpolation filters IF1, IF2 and decimation filters DF1, DF2. Changes in the channel frequency are made in modulators MOD1, MOD2 and demodulators DEM1, DEM2, and changes in modulation and coding are effected in encoders ENC1, ENC2 and decoders DEC1, DEC2.

As described above, there are two transmitting channels and two receiving channels in each modem. Signal transmission always occurs in only one transmitting channel and one receiving channel. The other transmitting or receiving channel is then not active. When control device SE receives a request for a change in the transmission channels, and thereupon recalculates the transmission parameters accordingly, it issues its new transmission parameters as control signals to the relevant circuit blocks for the transmitting or receiving channel that is not activated. As soon as the new transmission parameters have been set in the relevant modems of the central station, and the subscriber stations have also confirmed acquisition of the new transmission parameters via the signaling channel in control device SE, signal transmission and processing is continued in all affected modems on the other channel in which changeover to the modified transmission parameter has occurred. Therefore, if a change in the transmission parameters is necessary, for example because one or more additional transmission channels are requested or because the demand for frequency bands is different, signal transmission is continued using the old transmission parameters until the new transmission parameters have been set in the not-yet-activated transmitting or receiving channel, and only then does an abrupt changeover to that channel take place. Disruptive interruptions in signal transmission are thus avoided.

Control unit SE selects the transmitting and receiving channel in the relevant modems by defining the modulation and demodulation frequencies of those transmitting or receiving channels which are intended to continue with the transmission after the transmission parameters have changed.

In the exemplary embodiments described above, a separate signal path is assigned to each transmitting and receiving channel, i.e. a large proportion of the circuit blocks is present in paired fashion for the transmitting and the receiving direction. This circuitry outlay can be reduced by operating portions of both the two transmitted-signal paths and the two received-signal paths in a time-multiplexed fashion.

Figure 3:
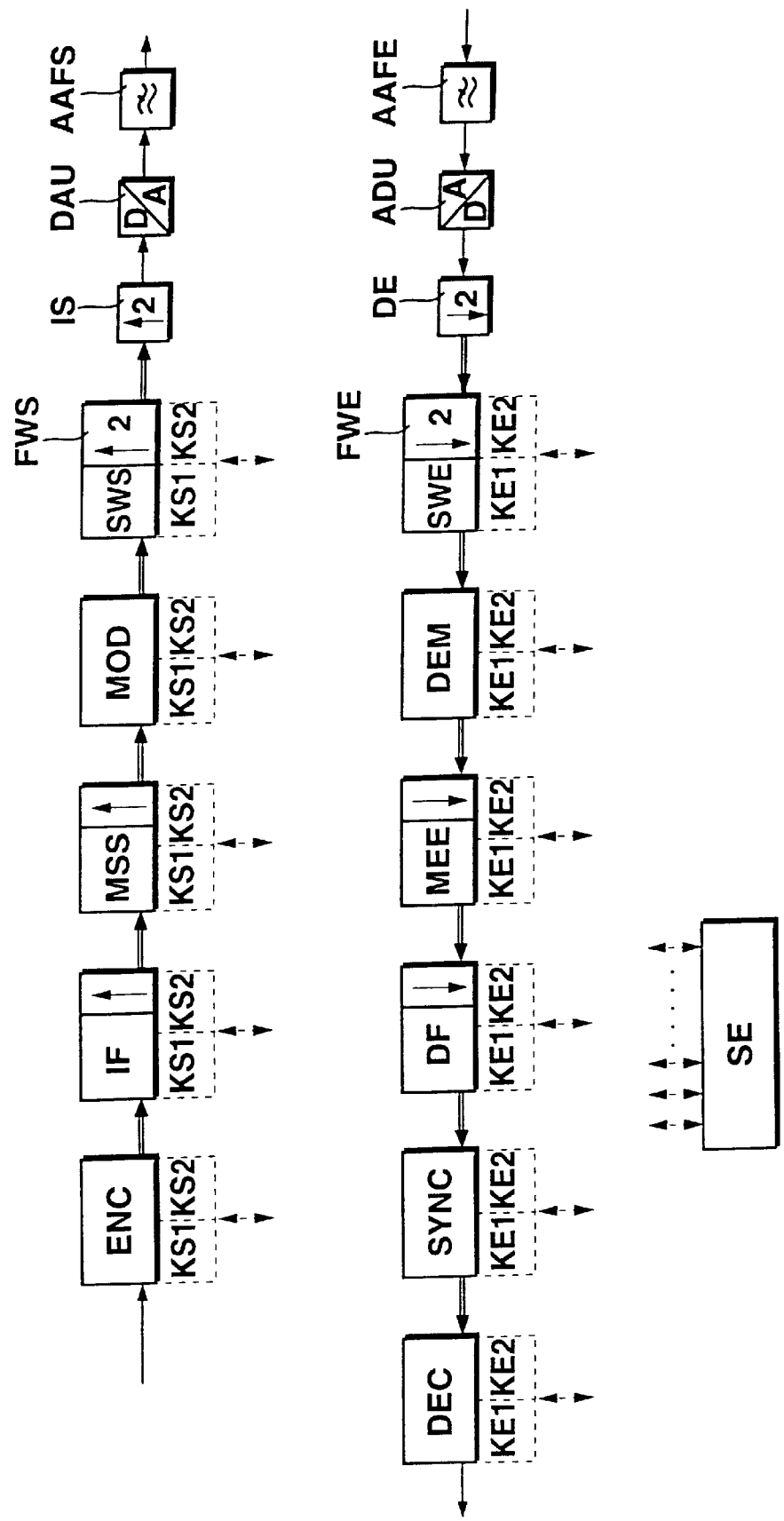
FIG. 3 shows a second embodiment of the modem according to the present invention having multiplexed transmitting and receiving channels.

FIG. 3 depicts a signal path for the two transmitting channels and a signal path for the two receiving channels. The transmitting signal path possesses, for both transmitting channels, an encoder ENC, a variable interpolation filter IF, and a modulator MOD. In addition, a further interpolator MSS with a fixed interpolation factor can be inserted between variable interpolation filter IF and modulator MOD, as shown in FIG. 3. The functions of the individual circuit blocks ENC, IF, MSS, MOD, and of the circuit blocks (interpolator IS, digital/analog converter DAU, antialiasing filter AAFS) downstream from switchable frequency splitters SWS, FWS, will not be further discussed here, since they have already been described in detail in connection with the exemplary embodiment depicted in FIG. 2.

The same is true for the individual circuit blocks of the received-signal path depicted in FIG. 3. This signal, in which all circuit blocks are present only once, is also provided for the transmission of both receiving channels.

The dashed-line blocks appended to the individual circuit units are intended to illustrate that the two transmitting channels KS1 and KS2 can be transmitted in time-multiplexed fashion via the one transmitted-signal path, and the two receiving channels KE1 and KE2 can be transmitted in time-multiplexed fashion via the one received-signal path.

A frequency-multiplexed signal (FDM) occurs in the one transmitted-signal path that processes the two transmitting channels in time-multiplexed fashion, and in the one received-signal path which processes the two receiving channels in time-multiplexed fashion, since an individual channel frequency is allocated to each transmitting and receiving channel in modulator MOD and demodulator DEM, respectively. Resolution of the time-multiplexed processing is performed in the transmitted-signal path by means of a multiplexer which is a component of frequency splitter FWS. Time-multiplexed processing in the received-signal path is made possible by a demultiplexer which is a component of frequency splitter FWE. In other words, the time multiplex is resolved in each case before the frequency multiplex takes place.

Figure 4:
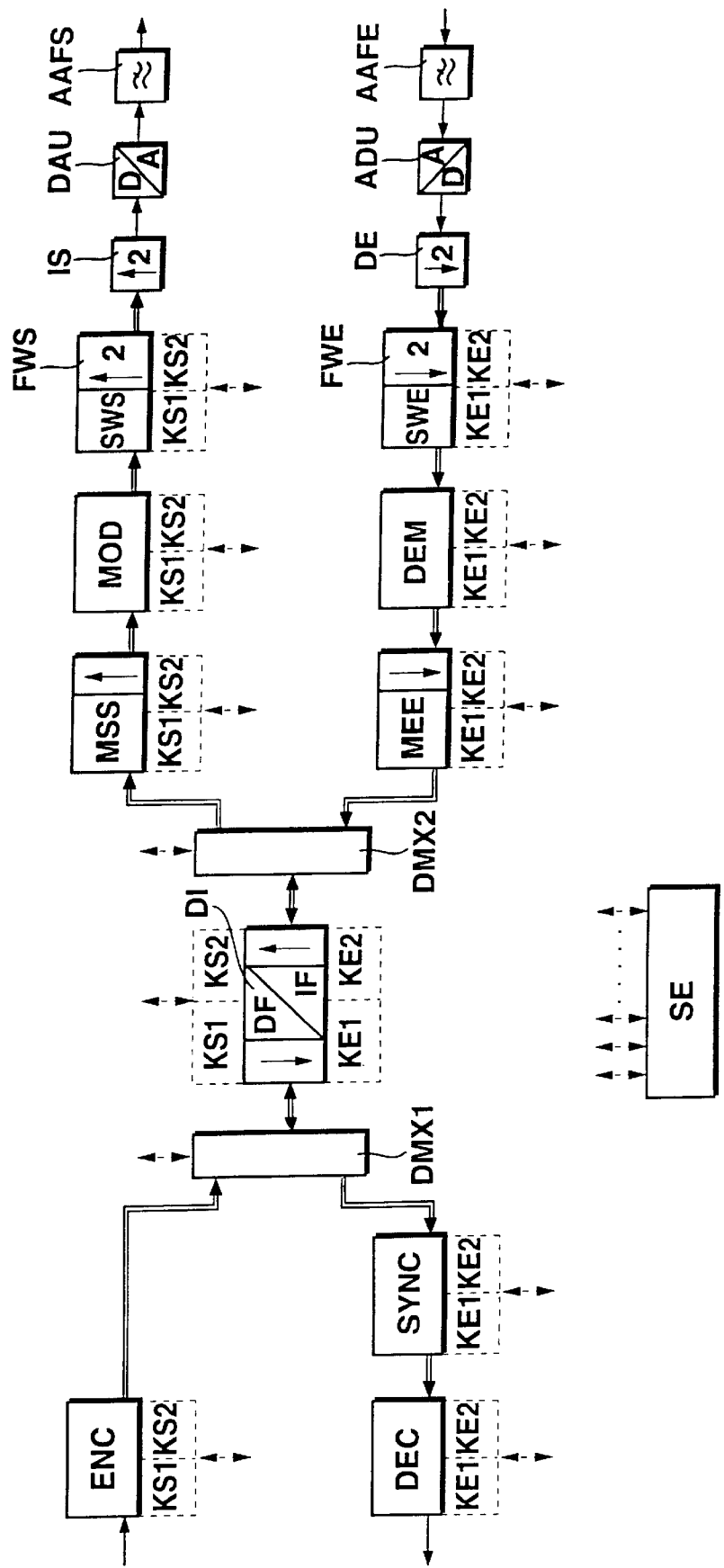
FIG. 4 shows a third embodiment of the modem according to the present invention having multiplexed transmitting and receiving channels.

A further concentration of circuit units can be achieved by the fact that, as depicted in FIG. 4, both transmitting channels and both receiving channels are multiplexed in terms of variable decimation and variable interpolation. A functional unit DI is provided for this purpose, containing both a variable decimation filter DF and a variable interpolation filter IF. Multiplexers/demultiplexers DMX1 and DMX2 at both ports of functional unit DI ensure that both the two transmitting channels and the two receiving channels can be transmitted in time-multiplexed fashion through functional unit DI. All other circuit units which bear the same reference characters as in FIG. 3 also have the same function as in the case of the exemplary embodiment of a modem depicted in FIG. 4.

Figure 5:
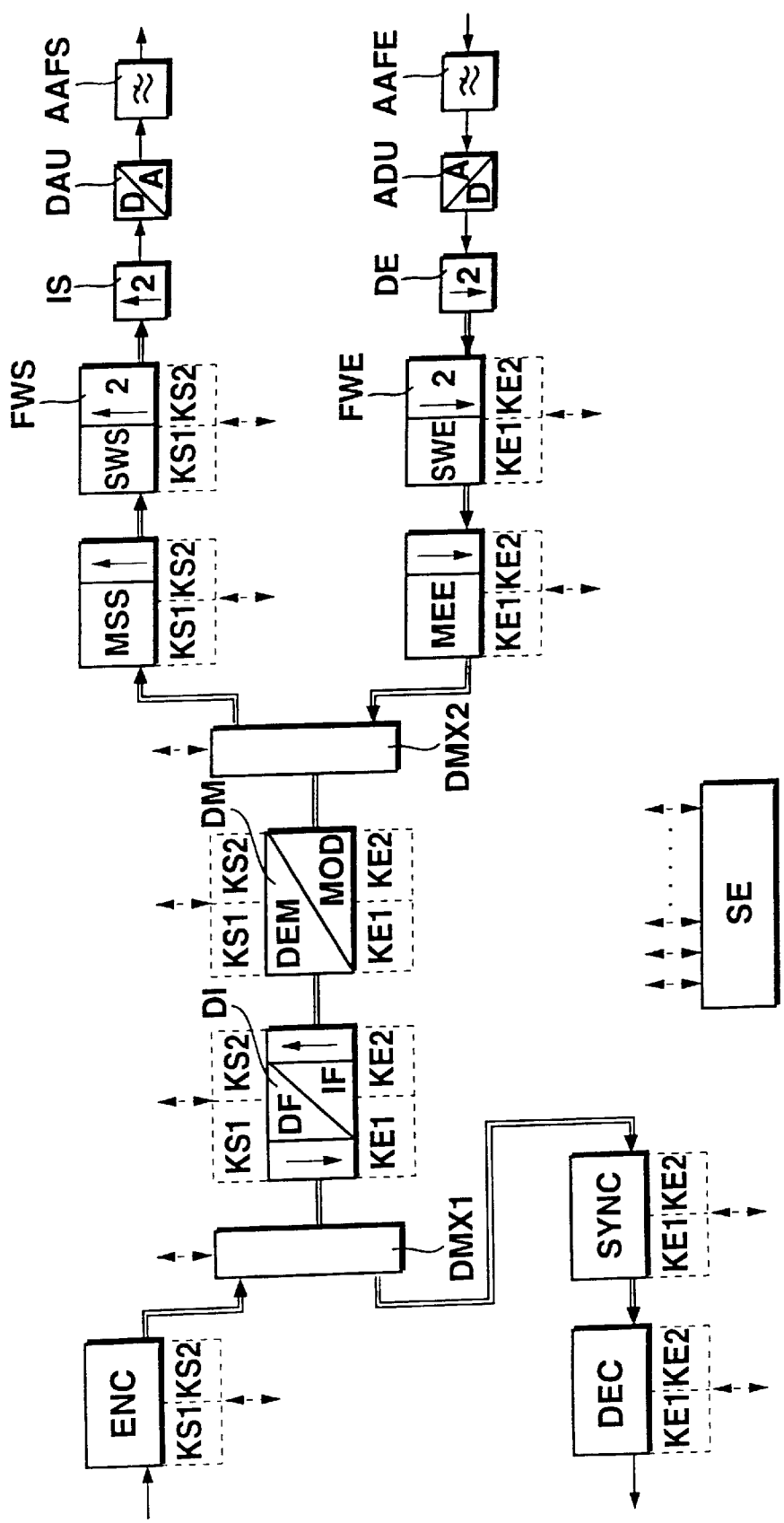
FIG. 5 shows a fourth embodiment of the modem according to the present invention having multiplexed transmitting and receiving channels.
Figure 6:
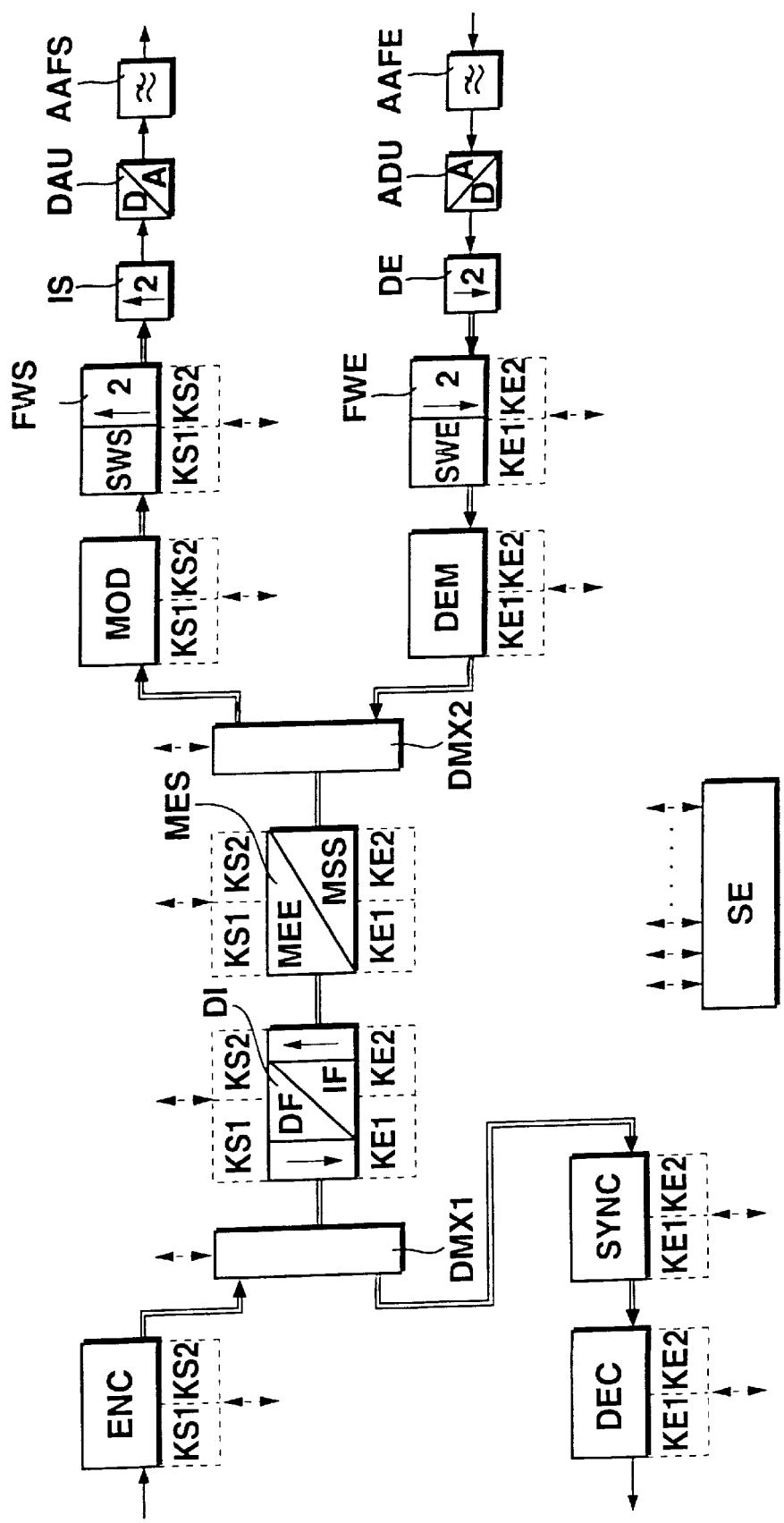
FIG. 6 shows a fifth embodiment of the modem according to the present invention having multiplexed transmitting and receiving channels.

In the case of the modem depicted in FIG. 5, demodulator DEM and modulator MOD are also combined into a common functional unit DM, which processes both the transmitting channels and the receiving channels on a time-multiplexed basis. This modem circuitry variant once again yields a reduction in circuit outlay. A disadvantage in this context, however, is the fact that interpolator MSS and decimator MEE have complex coefficients. In the exemplary embodiment depicted in FIG. 6, the sequence of modulator MOD and interpolator MSS, and the sequence of demodulator DEM and decimator MEE, are reversed. Interpolator MSS and decimator MEE, which are both combined into a functional unit MES, can thus be implemented with real coefficients. The advantages of time-multiplexed processing of the transmitted and received-signal paths are retained.

What is claimed is:

1. A point-to-multipoint radio transmission system, comprising:
   a central station utilizing a first set of transmission channels and including at least one central station modem for each channel of the first set of the transmission channels;
   subscriber stations utilizing a second set of transmission channels, each of the subscriber stations including at least one subscriber modem, each respective modem of the at least one station modem and of the at least one subscriber modem having two transmitting channels and two receiving channels, at least one signal being transmitted in the respective modem via only one of the transmitting or receiving channels; and
   a control device adjusting at least one transmission parameter in at least one of the station and subscriber modems when a change occurs in one of the first and second sets of transmission channels, the at least one transmission parameter being adjusted to optimally utilize a bandwidth of an available radio channel, the at least one transmission parameter including at least one of a channel carrier frequency, a data rate, a modulation, a coding, a transmit level and signal quality evaluation parameters,
   wherein, when the change occurs in one of the first and second sets of transmission channels, the control device adjusts further transmission parameters in a non-operating channel of the two transmitting channels or the two receiving channels, while the at least one signal is transmitted on a further channel of the two transmitting channels or the two receiving channels,
   wherein, when the further transmission parameters are acquired, the control device switches to the non-operating channel, and
   wherein at least one modem of the station and subscriber modems includes:
      a first frequency splitter dividing an entire frequency band available for transmitting the at least one signal into at least two first subbands, wherein the at least one transmitting channel signal is selectively assigned to the at least two first subbands; and
      a second frequency splitter dividing the entire frequency band available for receiving the at least one signal into at least two second subbands, wherein the at least one subband signal is selectively assigned to the two receiving channels.

2. The point-to-multipoint radio transmission system according to claim 1, wherein at least one modem of the station modem and subscriber modem includes:
   an encoder and a modulator which are assigned to each of the two transmitting channels, and
   an interpolation filter having an adjustable interpolation factor and preceding the modulator.

3. The point-to-multipoint radio transmission system according to claim 1, wherein at least one modem of the station modem and subscriber modem includes an interpolator following the first frequency splitter, the interpolator converting a complex digital output signal generated by the first frequency splitter to a real digital signal.

4. The point-to-multipoint radio transmission system according to claim 3, wherein the interpolator is a complex half-band filter.

5. The point-to-multipoint radio transmission system according to claim 1, wherein the second frequency splitter doubles a sampling frequency of the at least one signal.

6. The point-to-multipoint radio transmission system according to claim 1, wherein at least one modem of the station modem and subscriber modem includes:
   a demodulator and a decoder assigned to each of the two receiving channels, and
   a decimation filter following the demodulator, the decimation filter having an adjustable decimation factor.

7. The point-to-multipoint radio transmission system according to claim 1, wherein at least one modem of the station modem and subscriber modem includes a decimator preceding the second frequency splitter, the decimator converting real digital received signals into complex digital signals.

8. The point-to-multipoint radio transmission system according to claim 7, wherein the decimator is a complex half-band filter.

9. The point-to-multipoint radio transmission system according to claim 1, wherein the second frequency splitter reduces a sampling frequency of the at least one signal by one-half.

10. The point-to-multipoint radio transmission system according to claim 1, wherein each of the first and second frequency splitters includes two bandpass filters having overlapping bandpass regions.

11. The point-to-multipoint radio transmission system according to claim 1,
   wherein at least one modem of the station modem and subscriber modem includes an encoder, a modulator and a variable interpolation filter provided for both of the two transmitting channels, the interpolation filter having a variable interpolation factor and positioned between the encoder and the modulator, and
   wherein the at least one signal is transmittable via the two transmitting channels in a time-multiplexed manner via the encoder, the modulator and the variable interpolation filter.

12. The point-to-multipoint radio transmission system according to claim 1,
   wherein at least one modem of the station modem and subscriber modem includes a demodulator, a decoder and a decimation filter for both of the two receiving channels, the decimation filter having a variable decimation factor and positioned between the demodulator and the decoder, and
   wherein the at least one signal is transmittable on the two receiving channels in a time-multiplexed manner via the demodulator, the decimation filter and the decoder.

13. The point-to-multipoint radio transmission system according to claim 1, wherein the at least one modem of the station modem and the subscriber modem includes:

an encoder, a modulator and a common functional unit including a variable decimation filter and a variable interpolation filter provided for both of the two transmitting channels, the interpolation filter having a variable interpolation factor and positioned between the encoder and the modulator, and multiplexer/demultiplexers transmitting the at least one signal via the two transmitting channels and via the two receiving channels in a time-multiplexed fashion via the common functional unit.

14. The point-to-multipoint radio transmission system according to claim 1, wherein the at least one modem of the station modem and subscriber modem includes:

a demodulator, a decoder and a common functional unit including a variable decimation filter and a variable interpolation filter for both of the two receiving channels, the decimation filter having a variable decimation factor and positioned between the demodulator and the decoder, and multiplexer/demultiplexers transmitting the at least one signal via the two transmitting channels and via the two receiving channels in a time-multiplexed fashion via the common functional unit.

15. The point-to-multipoint radio transmission system according to claim 1, wherein the at least one modem of the station modem and subscriber modem includes:

an encoder, a modulator and a first functional unit including a variable decimation filter and a variable interpolation filter provided for both of the two receiving channels, the interpolation filter having a variable interpolation factor and positioned between the encoder and the modulator, a second functional unit including a modulator and a demodulator, and multiplexer/demultiplexers transmitting the at least one signal via the two transmitting channels and via the two receiving channels in a time-multiplexed fashion via the first and second functional units.

16. The point-to-multipoint radio transmission system according to claim 1, wherein the at least one modem of the station modem and subscriber modem includes:

a demodulator, a decoder and a first functional unit including a variable decimation filter and a variable interpolation filter for both of the two receiving channels, the decimation filter having a variable decimation factor and positioned between the demodulator and the decoder, a second functional unit including a modulator and a demodulator, and multiplexer/demultiplexers transmitting the at least one signal via the two transmitting channels and via the two receiving channels in a time-multiplexed fashion via the first and second functional units.

17. The point-to-multipoint radio transmission system according to claim 1, wherein the at least one modem of the station modem and subscriber modem includes:

an encoder, a modulator and a first functional unit including a variable decimation filter and a variable interpolation filter for both of the two receiving channels, the interpolation filter having a variable interpolation factor and positioned between the encoder and the modulator, a second functional unit including an interpolator and a decimator, the interpolator having a fixed interpolation factor, the decimator having a fixed decimation factor, and multiplexer/demultiplexers transmitting the at least one signal via the two transmitting channels and via the two receiving channels in a time-multiplexed fashion via the first and second functional units.

18. The point-to-multipoint radio transmission system according to claim 1, wherein the at least one modem of the station modem and subscriber modem includes:

a demodulator, a decoder and a first functional unit including a variable decimation filter and a variable interpolation filter for both of the two receiving channels, the decimation filter having a variable decimation factor and positioned between the demodulator and the decoder, a second functional unit including an interpolator and a decimator, the interpolator having a fixed interpolation factor, the decimator having a fixed decimation factor, and multiplexer/demultiplexers transmitting the at least one signal via the two transmitting channels and via the two receiving channels in a time-multiplexed fashion via the first and second functional units.

* * * * *

UNITED STATES PATENT AND TRADEMARK OFFICE
CERTIFICATE OF CORRECTION

PATENT NO.    : 6,185,202 B1
DATED         : February 6, 2001
INVENTOR(S)   : Gockler et al.

Page 1 of 1

It is certified that error appears in the above-identified patent and that said Letters Patent is hereby corrected as shown below:

Column 1,
Line 47, delete "The invention is based on the following realizations:".

Column 2,
Line 57, delete "is".

Signed and Sealed this

Ninth Day of April, 2002

Attest:

Attesting Officer

JAMES E. ROGAN
Director of the United States Patent and Trademark Office